(12) United States Patent
Ikeda

(10) Patent No.: US 6,509,720 B2
(45) Date of Patent: Jan. 21, 2003

(54) VEHICLE BATTERY CHARGE CONTROL APPARATUS AND A VEHICLE BATTERY CHARGE CONTROL METHOD

(75) Inventor: Sadafumi Ikeda, Chigasaki (JP)

(73) Assignee: Nissan Motor Co., Ltd., Kanagawa (JP)

(*) Notice: Subject to any disclaimer, the term of this patent is extended or adjusted under 35 U.S.C. 154(b) by 0 days.

(21) Appl. No.: 09/985,745

(22) Filed: Nov. 6, 2001

(65) Prior Publication Data

US 2002/0060551 A1 May 23, 2002

(30) Foreign Application Priority Data

Nov. 21, 2000 (JP) .......................................... 2000-354927

(51) Int. Cl.[7] .............................. H02J 7/00; H02J 7/84; B60K 1/00
(52) U.S. Cl. ........................................ 320/135; 780/65.1
(58) Field of Search ................................. 320/135, 136, 320/132, 134; 180/65.1

(56) References Cited

U.S. PATENT DOCUMENTS

| 4,313,080 A | 1/1982 | Park |
| 5,440,220 A | 8/1995 | Sato et al. |

FOREIGN PATENT DOCUMENTS

| JP | 6-6908 | 1/1994 |
| JP | 7-312804 | 11/1995 |
| JP | 08051701 | 2/1996 |
| JP | 8-182113 | 12/1996 |
| JP | 11-215610 | 8/1999 |

OTHER PUBLICATIONS

"Electric Vehicle Regenerative Braking", F. A. Whczalek et al., Conversion Technologies Electrochemical Conversions, San Diego, Aug. 3–7, 1992, Proceeding of the Intersociety Energy Conversion Engineering Conference (IECEC), New York, IEEE, US, vol. 3, Conf. 27, Aug. 3, 1992, pp. 3185–3190, XP000366170, ISBN 0-7803-0693-7.

*Primary Examiner*—Gregory J. Toatley, Jr.
(74) *Attorney, Agent, or Firm*—McDermott, Will & Emery (57) ABSTRACT

In a charge control apparatus for a vehicle battery comprising a control device that controls charge/discharge of the battery, a deceleration standby state detection device that detects a deceleration standby state of the vehicle and a decelerating state detection device that detects a decelerating state of the vehicle, the control device implements control so as to start a discharge at the battery if the deceleration standby state detection device detects that the vehicle is in a deceleration standby state and implements control so as to start a battery charge by halting battery discharge and storing the power generated by the generator if the decelerating state detection device detects that the vehicle is in a decelerating state following the discharge start.

8 Claims, 5 Drawing Sheets

VEHICLE BATTERY CHARGE CONTROL APPARATUS AND A VEHICLE BATTERY CHARGE CONTROL METHOD

BACKGROUND OF THE INVENTION

1. Field of the Invention

The present invention relates to a charge control apparatus used in conjunction with a vehicle battery that supplies power to a drive motor mounted in a vehicle and electrical parts of the vehicle.

2. Description of the Related Art

There is a method for charging a car battery achieved by converting the regenerative energy manifesting when the vehicle is decelerating to regenerative power with a motor or the like and supplying the regenerative power to the battery to charge it in the related art.

Figure 7:
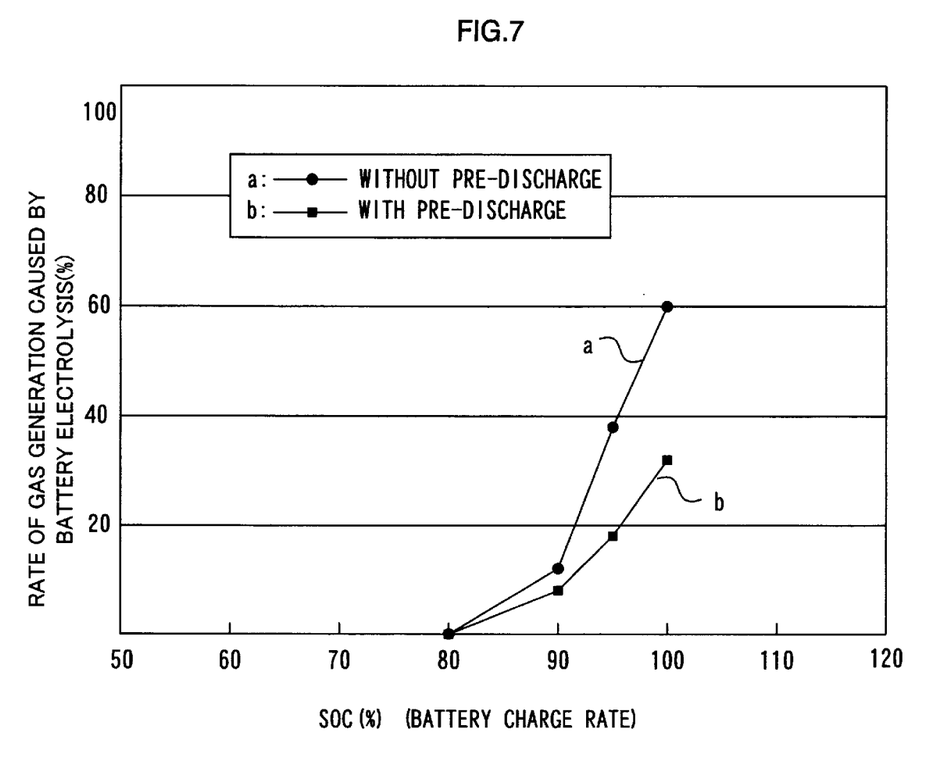
FIG. 7 presents the results of testing conducted to ascertain the relationship between the charge state (SOC) of a lead-acid battery and the gas generation rate manifesting when charging the lead-acid battery.

The limit on the rate of power absorption by the battery per unit time varies depending upon the quantity of power already stored in the battery. FIG. 7 illustrates the relationship between the battery SOC (state of charge) and the rate of gas generation resulting from the electrolysis of the battery fluid manifesting when a charging current flows to a lead-acid battery normally used for a vehicle battery, which is ascertained through testing. A gas is generated as a result of the electrolysis of the battery fluid if the limit to which the battery is capable of absorbing the regenerative power is exceeded.

The power absorption limit of the lead-acid battery per unit time is high when the quantity of power having been stored in the battery is small, i.e., when the sulfuric acid concentration in the battery fluid is low. If, on the other hand, the quantity of power having been stored in the battery is large, i.e., if the sulfuric acid concentration in the battery fluid is high, the power absorption limit per unit time is low. Accordingly, if the quantity of power having-been stored in the battery is large and the quantity of the regenerative power supplied per unit time exceeds the power absorption limit of the battery per unit time, the battery cannot completely absorb the regenerative power as indicated by the graph "a" in FIG. 7. The excess power is consumed through the heat generation at the battery and during the electrolytic process- of the battery fluid.

As described above, if the quantity of regenerative power supplied per unit time exceeds the power absorption limit of the battery per unit time, all the regenerative power cannot be absorbed by the battery. This poses a problem in that the battery fluid becomes electrolyzed due to the overcharging of the battery and the battery service life is reduced.

Japanese Laid-Open Patent Publication No. H 6-6908 discloses a vehicle battery charge control apparatus that addresses this problem.

The vehicle battery charge control apparatus disclosed in the publication caused the quantity of power charged into the battery to be varied in correspondence to the length of time having elapsed since the battery charge start. Namely, the smaller the length of time having elapsed since the battery charge start, the larger the quantity of power charged into the battery. As a result, the quantity of power is gradually reduced as the charging time lengthens. The correlation between the power absorption limit of the battery per unit time and the length of time over which regenerative power is absorbed into the battery is ascertained in advance through testing. Accordingly, the length of time having elapsed since the charge start is detected and the quantity of power to be charged into the battery is controlled in conformance to the correlation between the detected length of time and the power absorption limit per unit time to prevent the battery from becoming overcharged.

SUMMARY OF THE INVENTION

However, since control is implemented in the method disclosed in Japanese Laid-Open Patent Publication No. H 6-6908 so as to simply reduce the quantity of power to be charged into the battery as the battery charge period lengthens, it takes a long time to fully charge the battery, resulting in poor charging efficiency.

An object of the present invention is to provide a charge control apparatus and a charge control method for a vehicle battery that makes it possible to charge the battery with a high degree of efficiency without reducing the battery service life.

The present invention is applied to a charge control apparatus for a vehicle battery comprising a generator that generates power by converting regenerative energy manifesting when the vehicle decelerates to power, a control device that controls battery charge/discharge, a deceleration standby state detection device that detects a deceleration standby state of the vehicle and a decelerating state detection device that detects a decelerating state of the vehicle. In order to achieve the above noted object, the control device implements control so as to start a discharge at the battery if the deceleration standby state detection device detects that the vehicle is in a deceleration standby state and implements control so as to start a battery charge by halting the battery discharge and storing the power generated by the generator if the decelerating state detection device detects that the vehicle is in a decelerating state following the discharge start.

In the charge control method according to the present invention which is adopted in conjunction with a vehicle battery comprising detecting as to whether or not the vehicle is in a deceleration standby state, starting a battery discharge if the vehicle is detected to be in the deceleration standby state, detecting as to whether or not the vehicle is in a deceleration state and starting a battery charge by halting the battery discharge and utilizing regenerative power if the vehicle is detected to be in a decelerating state following the start of the battery discharge.

The present invention is also applies to a charge control apparatus for a vehicle battery comprising a generator that generates power by converting regenerative energy manifesting when the vehicle is decelerating to power, a control device that controls battery charge/discharge, an acceleration detection device that detects the acceleration of the vehicle and a timer that measures the length of discharge time having elapsed since a battery discharge start. In order to achieve the above noted object, the control device implements control so as to start a battery discharge if the acceleration detection device detects that the acceleration of the vehicle has been reduced to a value equal to or lower than 0 and implements control so as to start a battery charge by halting the battery discharge and storing the power generated by the generator when the discharge time measured by the timer matches a predetermined length of time.

In the charge control method according to the present invention which is adopted in conjunction with a vehicle battery comprising detecting the acceleration of the vehicle, starting a battery discharge if the detected acceleration is determined to have become equal to or less than 0 and starting a battery charge by halting the battery discharge and

DETAILED DESCRIPTION OF THE PREFERRED EMBODIMENTS

First Embodiment

Figure 1:
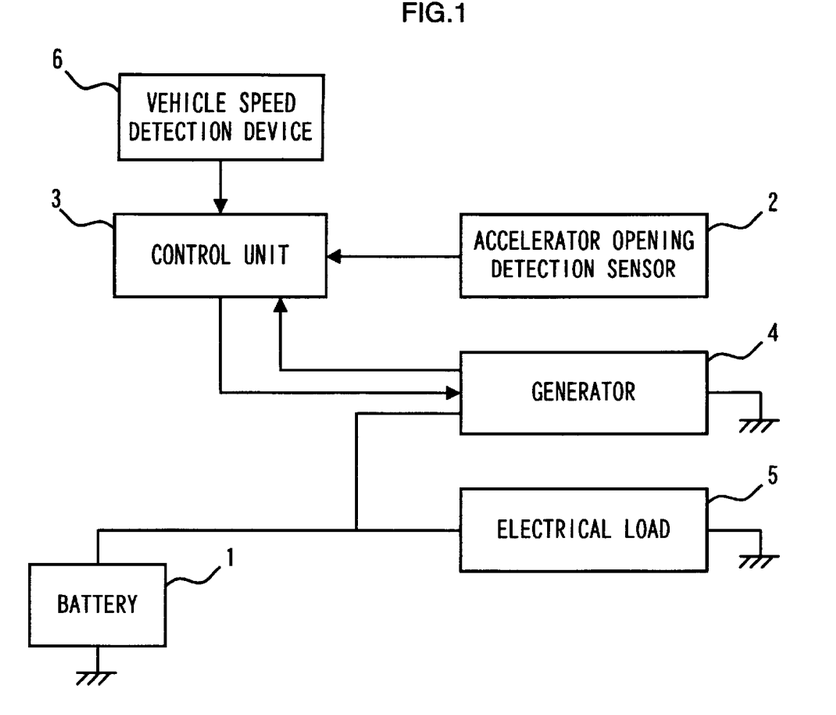
FIG. 1 is a block diagram showing the structure adopted in a first embodiment of the vehicle battery charge control apparatus according to the present invention.
Figure 3:
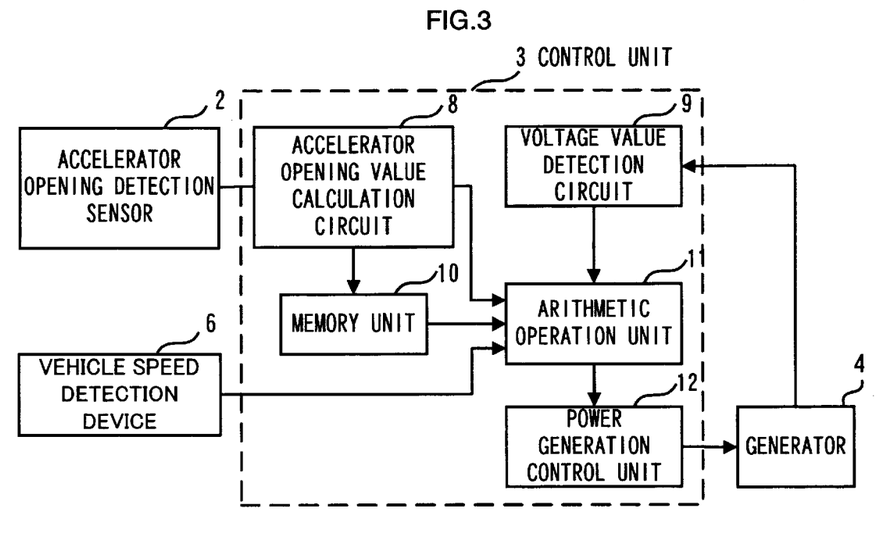
FIG. 3 is a block diagram showing the structure adopted in the control unit in the first embodiment.
Figure 5:
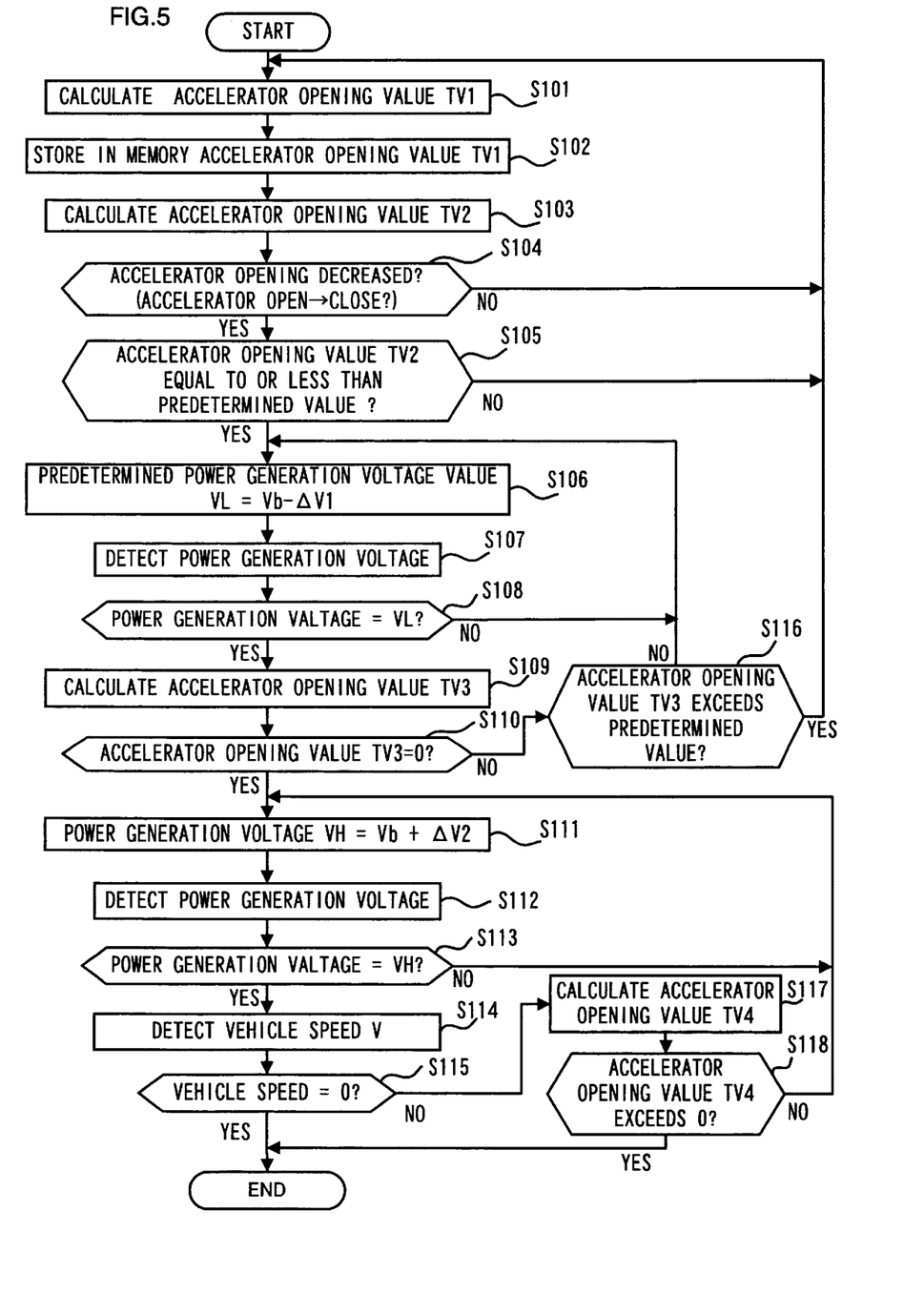
FIG. 5 is a flowchart of the processing implemented at the control unit in the first embodiment of the present invention.

The following is a detailed explanation of the first embodiment of the present invention, given in reference to FIGS. 1, 3 and 5.

FIG. 1 is a block diagram showing the structure adopted in the first embodiment of the vehicle battery charge control apparatus according to the present invention. A battery 1 which can be charged/discharged is mounted in a vehicle. A generator 4 connected to the battery 1 is capable of charging the battery 1 by converting the regenerative energy manifesting when the vehicle decelerates to regenerative power. An electrical load 5 also connected to the battery 1 is operated on power supplied from the battery 1. The electrical load 5 may be, for instance, a head lamp or a defroster. An accelerator opening detection sensor 2, which is connected to the control unit 3, detects the degree of depressing of the accelerator pedal or the degree of opening at a throttle valve and supplies an accelerator opening signal corresponding to the detected degree of depressing or opening to a control unit 3. A vehicle speed detection device 6 detects the vehicle speed and provides a vehicle speed signal corresponding to the detected vehicle speed to the control unit 3. The control unit 3 is connected with the generator 4, the accelerator opening detection sensor 2 and the vehicle speed detection device 6. The control unit 3 implements control on the generator 4 based upon the voltage of the power generated by the generator 4, the accelerator opening signal detected by the accelerator opening detection sensor 2 and the vehicle speed signal detected by the vehicle speed detection device 6.

The structure assumed in the control unit 3 is now explained in reference to FIG. 3. The control unit 3 includes an accelerator opening value calculation circuit 8, a voltage value detection circuit 9, a memory unit 10, an arithmetic operation unit 11 and a power generation control unit 12.

The accelerator opening value calculation circuit 8 calculates the accelerator opening value based upon the accelerator opening signal provided from the accelerator opening detection sensor 2. The accelerator opening value thus calculated is provided to the memory unit 10 and the arithmetic operation unit 11. The voltage value detection circuit 9 detects the voltage of the power generated by the generator 4. The voltage thus detected is provided to the arithmetic operation unit 11. The arithmetic operation unit 11 estimates the running state of the vehicle based upon the voltage values provided from the voltage value detection circuit 9, the accelerator opening value provided from the accelerator opening value calculation circuit 8 and the memory unit 10 and the vehicle speed provided by the vehicle speed detection device 6. Control information corresponding to the estimated running state is transmitted to the power generation control unit 12 The power generation control unit 12 implements control on the quantity of power generated by the generator 4 based upon the control information thus transmitted.

Details of the control achieved by the control unit 3 described above is now explained in reference to the flowchart presented in FIG. 5. It is to be noted that the flowchart in FIG. 5 shows the sequence of the internal processing achieved at the control unit 3 instead of showing the processing executed by a program.

In step S101, an accelerator opening value TV1 is calculated based upon the opening signal provided by the accelerator opening detection sensor 2. The calculation of the accelerator opening value TV1 is performed at the accelerator opening value calculation circuit 8. The calculated acceleration opening value TV1 is provided to the memory unit 10 and then the operation proceeds to step S102. In step S102, the accelerator opening value TV1 is stored in the memory unit 10. In the following step S103, the current accelerator opening value TV2 is calculated at the accelerator opening value calculation circuit 8. Once the accelerator opening value TV2 is calculated, the operation proceeds to step S104.

In step S104, the arithmetic operation unit 11 reads out of the accelerator opening value TV1 stored in the memory unit 10 and compares it to the current accelerator opening value TV2. Namely, it makes a decision as to whether the accelerator opening value has increased or decreased (whether the driver is pressing or releasing the accelerator). If it is decided that the accelerator opening value has decreased, the operation proceeds to step S105. If, on the other hand, it is decided that the accelerator opening value has increased, i.e., if it is decided that the driver intends to accelerate the vehicle, the operation returns to step S101 to calculate an accelerator opening value TV1 again.

In step S105, the arithmetic operation unit 11 makes a decision as to whether or not the current accelerator opening value TV2 is equal to or lower than a predetermined value (e.g., 10°). If it is decided that the current accelerator opening value TV2 is equal to or lower than the predetermined value, the operation proceeds to step S106 because the driver intends to decelerate the vehicle. In this case, the vehicle is in a deceleration standby state. If, on the other hand, it is decided that the accelerator opening value TV2 is larger than the predetermined value, there is a possibility that the driver intends to re-accelerate the vehicle, and thus, the operation returns to step S101 to calculate an accelerator opening value again.

In step S106, a command for setting the voltage of the power generated by the generator 4 to a predetermined value VL is issued from the arithmetic operation unit 11 to the power generation control unit 12. The power generation control unit 12 implements control to set the voltage of the power generated by the generator 4 to the predetermined value VL in response to the command that has been sent. A value that is lower than the voltage Vb at the battery 1 by ΔV1 is preselected for the predetermined value VL. The battery voltage Vb is an estimated battery voltage obtained by taking into consideration the inconsistency among individual batteries 1 and deterioration occurring over time. By setting the voltage of the power generated by the generator 4 lower than the battery voltage Vb, the power supplied to the battery 1 is less than that required by the electrical load 5 in the vehicle. In other words, the battery 1 is discharged in step S106.

In step S107, the value of the voltage at the generator 4 is detected by the voltage value detection circuit 9. After the detected voltage value is transmitted to the arithmetic operation unit 11, the operation proceeds to step S108. In step S108, a decision is made as to whether or not the voltage of the power generated by the generator 4 matches the predetermined value VL. This decision is made by the arithmetic operation unit 11. If it is decided that the voltage of the power generated by the generator 4 matches the predetermined value VL, the operation proceeds to step S109. If it is decided that the voltage of the power generated by the generator 4 does not match the predetermined value VL, on the other hand, the operation returns to step S106 to discharge the battery 1 by implementing control on the voltage of the power generated by the generator 4 again.

Instep S109, the accelerator opening value calculation circuit 8 calculates an accelerator opening value TV3. The accelerator opening value TV3 thus calculated is provided to the arithmetic operation unit 11. In the following step S110, the arithmetic operation unit 11 makes a decision as to whether or not the accelerator opening value TV3 is 0. If it is decided that the accelerator opening value TV3 is practically 0, the operation proceeds to step S111 to halt the discharge in progress at the battery 1 because the vehicle has shifted into a decelerating state. If it is decided that the accelerator opening value TV3 is not 0, the operation proceeds to step S116.

In step S116, a decision is made at the arithmetic operation unit 11 as to whether or not the accelerator opening value TV3 is larger than a predetermined value. If it is decided that the accelerator opening value TV3 exceeds the predetermined value, the operation returns to step S101. If it is decided that the accelerator opening value TV3 is equal to or less than the predetermined value, on the other hand, the operation returns to step S106 to discharge the battery 1 by implementing control on the voltage of the power generated by the generator 4 again.

In step S111, the arithmetic operation unit 11 issues a command for setting the voltage of the power generated by the generator 4 to a charging voltage value VH to the power generation control unit 12. In response to the command, the power generation control unit 12 implements control so as to set the voltage of the power generated by the generator 4 to the charging voltage value VH. The voltage value VH is higher than the voltage Vb at the battery 1 by ΔV2 and, thus, the battery 1 becomes charged. In other words, the discharge in progress at the battery 1 is halted and a charge of the battery 1 is started in step S111. It is to be noted that ΔV2 is a value that changes in correspondence to the rate of deceleration of the vehicle.

In step S112, the voltage of the power generated by the generator 4 is detected by the voltage value detection circuit 9. The detected voltage of the generated power is provided to the arithmetic operation unit 11.

In step S113, a decision is made at the arithmetic operation unit 11 as to whether or not the voltage of the generated power detected in step S112 matches the charging voltage value VH. If it is decided that the voltage of the power generated by the generator 4 matches the voltage value VH, the operation proceeds to step S114. If it is decided that the voltage of the power generated by the generator 4 does not match the voltage value VH, on the other hand, the operation returns to step S111 to charge the battery 1 by implementing control on the voltage of the power generated by the generator 4 again. In step S114, the vehicle speed detection device 6 detects the vehicle speed V. The detected vehicle speed V is provided to the arithmetic operation unit 11.

In step S115, a decision is made at the arithmetic operation unit 11 as to whether or not the vehicle speed.V detected in step S114 is 0 (whether or not the vehicle is in a stationary state). If it is decided that the vehicle speed V is 0, the arithmetic operation unit 11 issues a command for setting the voltage of the power generated by the generator 4 to a normal power generation voltage, i.e., a command for disallowing either a discharge or a charge at the battery 1, to the power generation control unit 12. The normal power generation voltage refers to a voltage equal to the voltage at the battery 1. In response to the command, the power generation control unit 12 ends the charge at the battery 1 by implementing control so as to set the voltage of the power generated by the generator 4 to the normal power generation voltage. If, on the other hand, it is decided that the vehicle speed V is equal to or higher than 0, the operation proceeds to step S117.

Instep S117, the accelerator opening value calculation circuit 8 detects an accelerator opening value TV4. Once the detected accelerator opening value TV4 is provided to the arithmetic operation unit 11, the operation proceeds to step S118. In step S118, the arithmetic operation unit 11 makes a decision as to whether or not the accelerator opening value TV4 is larger than 0. If the acceleration opening value TV 4 is larger than 0, it is judged that the driver has accelerated the vehicle again and the charge at the battery 1 ends. If, on the other hand, the acceleration opening value TV4 is 0, the operation returns to step S111 to continuously charge the battery 1 since the vehicle is decelerating.

In the vehicle battery charge control apparatus achieved in the first embodiment described above, the battery 1 is charged/discharged as detailed below. The degree to which the accelerator pedal is depressed or the degree to which the throttle valve is opened is detected by the accelerator opening detection sensor 2. If the arithmetic operation unit 11 detects that the degree of depressing or opening thus detected has decreased to a value equal to or smaller than a predetermined degree of depressing or opening, the power in the battery 1. is discharged to the electrical load 5 of the vehicle. The degree of depressing at the accelerator pedal or the degree of opening at the throttle valve is detected again by the accelerator opening detection sensor 2 following the discharge start. If the arithmetic operation unit 11 detects that the detected opening is 0°, the vehicle is judged to be in a decelerating state. In such a case, the discharge in progress at the battery 1 is halted and a charge operation starts at the battery 1. In other words, by discharging the power in the battery 1 after detecting that the vehicle is in a deceleration standby state, the power absorption limit of the battery 1 per unit time can be temporarily increased.

A graph "b" in FIG. 7 represents the results achieved by controlling charge/discharge of the battery 1 with the vehicle battery charge control apparatus according to the present invention. Compared to the results represented by the graph "a" which are achieved through the method in the related art, the rate of gas generation resulting from the electrolysis of the battery fluid is lowered. In other words, they demonstrate that the regenerative power is absorbed by the battery 1 with a higher degree of efficiency. Thus, even when the quantity of regenerative power supplied per unit time is significant, the battery 1 can be charged with a high degree of efficiency without reducing the quantity of power charged into the battery 1.

In addition, by temporarily increasing the regenerative power absorption efficiency, any reduction in the service life of the battery attributable to overcharging can be prevented even when the power absorption limit of the battery 1 per unit time changes due to deterioration of the battery 1 occurring over time, the operating conditions, inconsistency in the individual characteristics of the battery 1 and the like. Since the control to start a discharge and to halt a discharge at the battery 1 can be achieved in correspondence to the accelerator depressing degree or the throttle valve opening degree, it is not necessary to add a special sensor, minimizing the extent to which the production costs increase.

By selecting a small value, e.g., approximately 10°, for the predetermined opening, the length of time required to discharge the battery 1 can be reduced. Thus, it is possible to prevent deterioration of the battery 1 attributable to unnecessary discharge.

Second Embodiment

Figure 2:
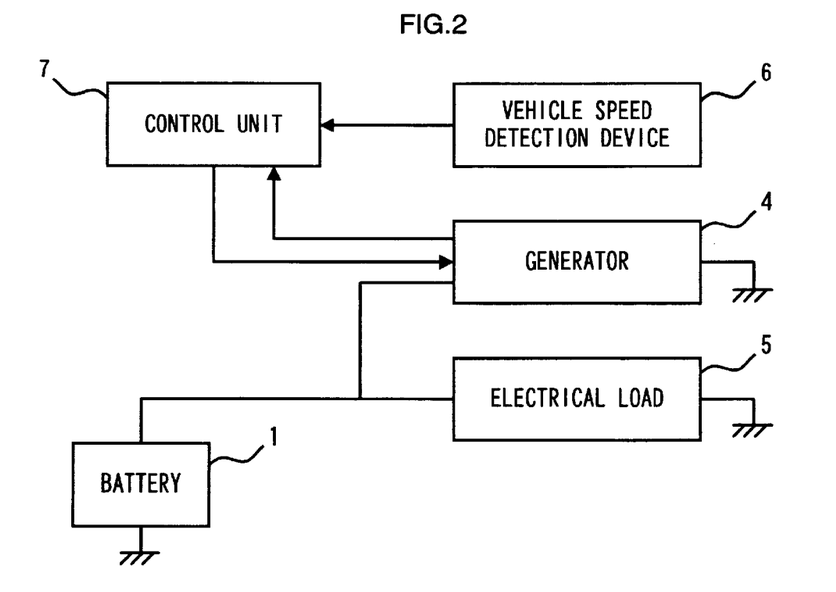
FIG. 2 is a block diagram showing the structure adopted in a second embodiment of the vehicle battery charge control apparatus according to the present invention.
Figure 4:
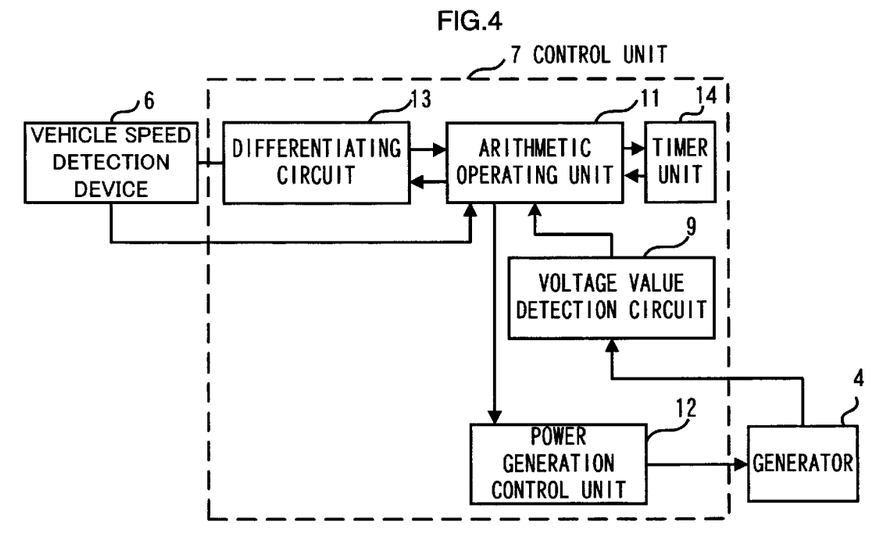
FIG. 4 is a block diagram showing the structure adopted in the control unit in the second embodiment.
Figure 6:
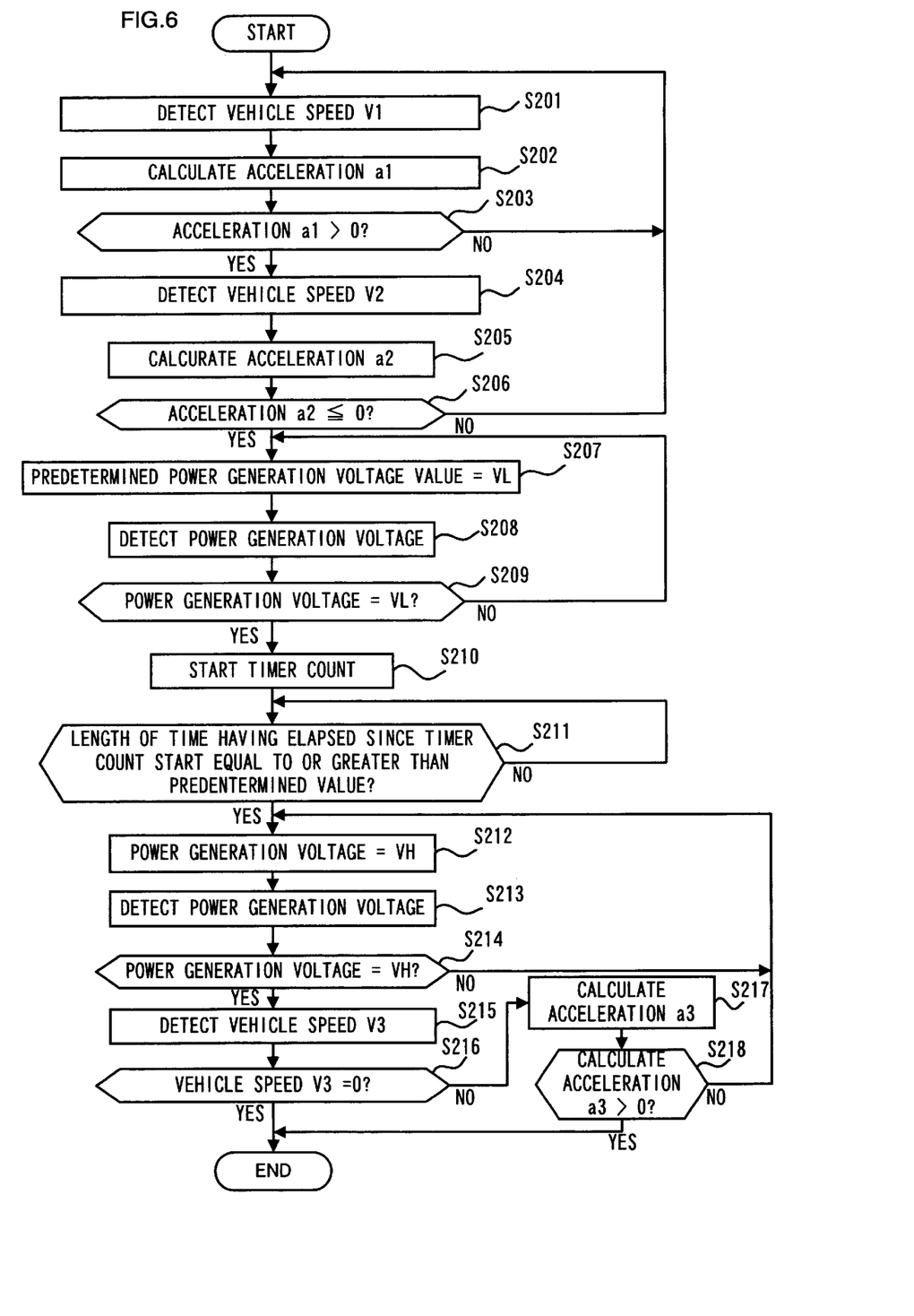
FIG. 6 is a flowchart of the processing implemented at the control unit in the second embodiment of the present invention.

The vehicle battery charge control apparatus achieved in the second embodiment is explained in detail in reference to FIGS. 2, 4 and 6. It is to be noted that the same reference numerals are assigned to components identical or similar to those in the first embodiment.

FIG. 2 presents a block diagram of the structure assumed in the second embodiment of the vehicle battery charge control apparatus according to the present invention. Unlike the vehicle battery charge control apparatus in the first embodiment, the vehicle battery charge control apparatus in the second embodiment does not include the accelerator opening detection sensor 2. In addition, the processing implemented at a control unit 7 in the second embodiment differs from the processing performed at the control unit 3 in the first embodiment. Now, an explanation is given on the structure of the control unit 7 in reference to FIG. 4.

The control unit 7 includes a voltage value detection circuit 9, an arithmetic operation unit 11, a power generation control unit 12, a differentiating circuit 13 and a timer unit 14.

The differentiating circuit 13 calculates the acceleration of the vehicle by performing time differentiation on the value of the vehicle speed provided by the vehicle speed detection device 6. The calculated acceleration is sent to the arithmetic operation unit 11. The timer unit 14, which is activated in response to a time count start signal provided by the arithmetic operation unit 11, measures the length of time that has elapsed since the activation. The length of time thus measured is provided to the arithmetic operation unit 11. The voltage value detection circuit 9 detects the value of the voltage at the generator 4. The detected voltage value is provided to the arithmetic operation unit 11.

The arithmetic operation unit 11 estimates the state in which the vehicle is running based upon the vehicle speed value detected by the vehicle speed detection device 6, the voltage value detected by the voltage value detection circuit 9, the length of elapsed time measured by the timer unit 14 and the acceleration calculated by the differentiating circuit 13 and then obtains control information corresponding to the estimated running state through an arithmetic operation. The control information obtained through the arithmetic operation is provided to the power generation control unit 12. The power generation control unit 12 implements control on the power generation at the generator 4 in conformance to the provided control information, i.e., in response to the control command.

FIG. 6 presents a flowchart of the control procedure achieved at the control unit 7. This flowchart does not show the processing executed by a program in the control unit 7, either.

The vehicle speed is detected by the vehicle speed detection device 6 in step S201. The detected vehicle speed value V1 is provided to the differentiating circuit 13. In step S202, the differentiating circuit 13 calculates the acceleration al of the vehicle by performing time differentiation on the vehicle speed value V1 thus provided. In step S203, the arithmetic operation unit 11 makes a decision as to whether or not the calculated acceleration a1 exceeds 0, i.e., whether or not the acceleration a1 is a positive value. If it is decided that the acceleration al is a positive value, the operation proceeds to step S204, whereas if the acceleration al is equal to or less than 0, i.e., if the vehicle is running at a constant speed or if it is decelerating, the operation returns to step S201 to detect the vehicle speed again.

In step S204, the current vehicle speed is detected by the vehicle speed detection device 6. The detected vehicle speed value V2 is provided to the differentiating circuit 13 before the operation proceeds to step S205. In step S205, the acceleration a2 of the vehicle is calculated at the differentiating circuit 13 by performing time differentiation on the vehicle speed value V2 thus provided. Once the acceleration a2 of the vehicle is calculated, operation proceeds to step S206.

In step S206, the arithmetic operation unit 11 makes a decision as to whether or not the acceleration a2 is equal to or less than 0. If it is decided that the acceleration a2 is substantially equal to or less than 0, the operation proceeds to step S207, whereas if it is decided that the acceleration a2 is a larger than 0, the operation returns to step S201 to detect the vehicle speed again. Namely, if it is decided in step S203 that the acceleration al is a positive value and it is decided in step S206 that the acceleration a2 is equal to or less than 0, the operation proceeds to step S207 because the driver intends to decelerate the vehicle from the state in which it has been accelerated.

In step S207, the arithmetic operation unit 11 issues a command for setting the voltage of the power generated by the generator 4 to VL to the power generation control unit 12. In response to the command issued by the arithmetic operation unit 11, the power generation control unit 12 implements control on the generator 4 so as to set the power generation voltage to the predetermined value VL. Through this control, power in the battery 1 is discharged. It is to be noted that since the predetermined value VL is selected on the same principle as the predetermined value VL explained in reference to the first embodiment, its explanation is omitted.

In step S208, the voltage of the power generated by the generator 4 is detected by the voltage value detection circuit 9. The detected voltage value is provided to the arithmetic operation unit 11 before the operation proceeds to step S209. In step S209, the arithmetic operation unit 11 makes a decision as to whether or not the voltage of the power generated by the generator 4 matches the predetermined value VL. If it is decided that the voltage of the power generated by the generator 4 matches the predetermined value VL, the operation proceeds to step S210. However, if it is decided that the voltage of the power generated by the generator 4 does not match the predetermined value VL, the operation returns to step S207 to discharge the battery 1 by implementing control on the voltage of the power generated by the generator 4 again.

In step S210, the time count start signal is transmitted from the arithmetic operation unit 11 to the timer unit 14 to activate the timer unit 14. The timer unit 1.4 having received the time count start signal measures the length of time having elapsed since the activation and transmits the measured value to the arithmetic operation unit 11. In step S211, the arithmetic operation unit 11 detects the length of elapsed time transmitted from the timer unit 14, i.e., the length of time having elapsed since the time point at which the discharge started at the battery 1, and if it is decided that the detected length of time matches a predetermined value (e.g., 0.5 sec), the operation proceeds to step S212. If it, is decided, on the other hand, that the predetermined length of time has not elapsed, the operation waits for the predetermined length of time to elapse in step S211.

In step S212, a command for setting the voltage of the power generated by the generator 4 to the charging voltage value VH is issued by the arithmetic operation unit 11 to the power generation control unit 12. In response to the command, the power generation control unit 12 implements control on the generator 4 so as to set the voltage of the power generated by the generator 4 to the charging voltage value VH. As a result, the battery 1 becomes charged. It is to be noted that since the voltage value VH is selected on the same principle as the voltage value VH explained earlier in reference to the first embodiment of the present invention, its explanation is omitted. In step S213, the voltage of the power generated by the generator 4 is detected by the voltage value detection circuit 9. The detected power generation voltage is provided to the arithmetic operation unit. 11.

In step S214, the arithmetic operation unit 11 makes a decision as to whether or not the voltage of the power generated by the generator 4 matches the charging voltage value VH. If it is decided that the voltage of the power generated by the generator 4 matches the charging voltage value VH, the operation proceeds to step S215. If it is decided that the voltage of the power generated by the generator 4 does not match the charging voltage value VH, on the other hand, the operation returns to step S212 to charge the battery 1 by implementing control on the voltage of the power generated by the generator 4 again. In step S215, the vehicle speed detection device 6 detects the current vehicle speed value V3 and provides the detected vehicle speed value to the arithmetic operation unit 11.

In step S216, the arithmetic operation unit 11 makes a decision as to whether or not the vehicle speed value V3 detected in step S215 is 0 (whether or not the vehicle is in a stationary state). If it is decided that the vehicle speed value V3 is substantially 0, the arithmetic operation unit 11 issues a command for halting the charge in progress at the battery 1 to the power generation control unit 12. In response to the command, the power generation control unit 12 halts the charge in progress at the battery 1 by controlling the voltage of the power generated by the generator 4. If it is decided that the vehicle speed value V3 is equal to or larger than 0, on the other hand, the vehicle speed value V3 is provided to the differentiating circuit 13 from the arithmetic operation unit 11 before the operation proceeds to step S217.

In step S217, the differentiating circuit 13 calculates an acceleration a3 by performing time differentiation on the vehicle speed value V3 that has been provided. The calculated acceleration a3 is provided to the arithmetic operation unit 11 before the operation proceeds to step S218. In step S218, the arithmetic operation unit 11 makes a decision as to whether or not the acceleration a3 exceeds 0. If it is decided that the acceleration a3 exceeds 0, a command for halting the charge in progress at the battery 1 is issued from the arithmetic operation unit 11 to the power generation control unit 12, because the driver intends to re-accelerate the vehicle. In response to the command, the power generation control unit 12 halts the charge in progress at the battery 1 by controlling the voltage of the power generated by the generator 4. If it is decided that the acceleration a3 is equal to or less than 0, the operation returns to step S212 to continue the charge operation in progress at the battery 1.

In the vehicle battery charge control apparatus achieved in the second embodiment, the charge/discharge of the battery 1 is controlled as described below. The speed of the vehicle is detected by the vehicle speed detection device 6 and, based upon the detected vehicle speed, the differentiating circuit 13 calculates the acceleration of the vehicle. If it is detected that the acceleration of the vehicle thus calculated is equal to or less than 0, the power in the battery 1 is discharged to the electrical load 5 of the vehicle. The length of time having elapsed since the start of the discharge is measured by the timer unit 14, and when it is detected that the measured length of time matches a predetermined length of time, the discharge in progress at the battery 1 is halted and a charge operation is started. As a result, advantages similar to those achieved in the first embodiment are realized. In addition, since the discharge of the battery 1 is started based upon the vehicle speed detected by the vehicle speed detection device 6, it is not necessary to add a special sensor, which makes it possible to minimize the extent to which the production costs increase.

Furthermore, by varying the predetermined length of time used for the comparison against the length of time measured by the timer unit 14, the length of time to elapse between the discharge start at the battery 1 and the discharge interruption can be also varied, which makes it possible to vary the length of discharge time in conformance to the specifications of individual batteries 1. By selecting a small value, e.g., approximately 0.5 seconds for the predetermined length of time, the discharge time can be reduced so that the battery 1 is prevented from becoming degraded due to unnecessary discharge.

The present invention is not limited to the examples presented in the embodiments described above. For instance, while the period over which the discharge is performed prior to a charge operation of the battery 1 is set in correspondence to the degree of the accelerator depressing or the degree of the throttle opening in the vehicle battery charge control apparatus in the first embodiment, the discharge time may be set by providing a timer as in the second embodiment. In other words, the processing in steps S210 and S211 in the flowchart presented in FIG. 7 may be implemented instead of the processing in steps S109 and S110 in the flowchart presented in FIG. 6.

While the acceleration of the vehicle is ascertained based upon the vehicle speed detected by the vehicle speed detection device 6 in.the vehicle battery charge control apparatus achieved in the second embodiment, the acceleration may be ascertained through another method. For instance, the acceleration sensor provided in the air bag system may be utilized for this purpose, or another acceleration sensor may be provided.

The disclosure of the following priority application is herein incorporated by reference: Japanese Patent Application No. 2000-354927 filed Jun. 12, 2000.

What is claimed is:

1. A vehicle battery charge control apparatus comprising;
   a generator that generates power by converting regenerative energy manifesting when the vehicle decelerates to power;
   a control device that controls charge/discharge of the battery;
   a deceleration standby state detection device that detects a deceleration standby state of the vehicle; and
   a decelerating state detection device that detects a decelerating state of the vehicle, wherein;
   said control device implements control so as to start a discharge at the battery if said deceleration standby state detection device detects that the vehicle is in a deceleration standby state and implements control so as to start a battery charge by halting the battery discharge and storing the power generated at said generator if said decelerating state detection device detects that the vehicle is in a decelerating state following a discharge start.

2. A vehicle battery charge control apparatus according to claim 1, further comprising;
   an opening detection device that detects an accelerator pedal depressing degree or a throttle opening degree wherein;
   said decelerating standby state detection device detects that the vehicle is in a decelerating standby state by detecting with said opening detection device that said accelerator pedal depressing degree or said throttle opening degree has decreased to a value equal to or smaller than a specific predetermined opening degree; and
   said decelerating state detection device detects that the vehicle is in a decelerating state by detecting with said opening detection device that said accelerator pedal depressing degree or said throttle opening degree is 0.

3. A vehicle battery charge control apparatus comprising;
   a power generation means for generating power by converting regenerative energy manifesting when the vehicle decelerates to power;
   a control means for controlling charge/discharge of the battery;
   a deceleration standby state detection means for detecting a deceleration standby state of the vehicle; and
   a deceleration start detection means for detecting a decelerating state of the vehicle, wherein;
   said control means implements control so as to start a discharge at the battery if said deceleration standby state detection means detects that the vehicle is in a deceleration standby state and implements control so as to start a battery charge by halting the battery discharge and storing the power generated at said power generation means if said decelerating state detection means detects that the vehicle is in a decelerating state following the discharge start.

4. A method of vehicle battery charge control comprising;
   detecting as to whether or not the vehicle is in a deceleration standby state;
   starting a battery discharge if the vehicle is detected to be in the deceleration standby state;
   detecting as to whither or not the vehicle is in a deceleration state; and
   starting a battery charge by utilizing regenerative power by halting the battery discharge if the vehicle is detected to be in a decelerating state following the battery discharge start.

5. A vehicle battery charge control apparatus comprising;
   a generator that generates power by converting regenerative energy manifesting when the vehicle is decelerating to power;
   a control device that controls charge/discharge of the battery;
   an acceleration detection device that detects acceleration of the vehicle; and
   a timer that measures the length of discharge time having elapsed since a battery discharge start, wherein;
   said control device implements control so as to start a battery discharge if said acceleration detection device detects that the acceleration of the vehicle has been lowered to a value equal to or less than 0 and implements control so as to start a battery charge by halting the battery discharge and storing the power generated at said generator when the discharge time measured by said timer matches a predetermined length of time.

6. A vehicle battery charge control apparatus according to claim 5, further comprising;
   a vehicle speed detection device that detects vehicle speed, wherein;
   said.acceleration detection device ascertains the acceleration of the vehicle based upon the vehicle speed detected by said vehicle speed detection device.

7. A vehicle battery charge control apparatus comprising;
   a power generation means for generating power by converting regenerative energy manifesting when the vehicle is decelerating to power;
   a control means for controlling charge/discharge of the battery;
   an acceleration detection means for detecting acceleration of the vehicle; and
   a time count means for measuring the length of discharge time having elapsed since a battery discharge start, wherein;
   said control means implements control so as to start a battery discharge if said acceleration detection means detects that the acceleration of the vehicle has been reduced to a value equal to or less than 0 and implements control so as to start a battery charge by halting the battery discharge and storing the power generated at said power generation means when the discharge time measured by said time count means matches a predetermined length of time.

8. A method of vehicle battery charge control comprising;
   detecting an acceleration of the vehicle;
   starting a battery discharge if the detected acceleration is determined to have been reduced to a value equal to or less than 0; and
   starting a battery charge by halting the battery discharge and using regenerative power when the length of time having elapsed since the battery discharge start matches a predetermined length of time.

* * * * *